United States Patent
Fan et al.

(10) Patent No.: US 10,846,082 B2
(45) Date of Patent: Nov. 24, 2020

(54) SYSTEMS AND METHODS FOR DETERMINING AND ENFORCING THE OPTIMAL AMOUNT OF SOURCE CODE COMMENTS

(71) Applicant: Microsoft Technology Licensing, LLC, Redmond, WA (US)

(72) Inventors: Liya Fan, Beijing (CN); Haibo Lin, Issaquah, WA (US); Zhong Zheng, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/331,941

(22) PCT Filed: Sep. 8, 2016

(86) PCT No.: PCT/CN2016/098410
§ 371 (c)(1),
(2) Date: Mar. 8, 2019

(87) PCT Pub. No.: WO2018/045526
PCT Pub. Date: Mar. 15, 2018

(65) Prior Publication Data
US 2019/0205124 A1    Jul. 4, 2019

(51) Int. Cl.
*G06F 9/44* (2018.01)
*G06F 17/00* (2019.01)
(Continued)

(52) U.S. Cl.
CPC ............... *G06F 8/73* (2013.01); *G06F 8/72* (2013.01); *G06Q 10/06395* (2013.01);
(Continued)

(58) Field of Classification Search
CPC ..... G06F 8/73; G06F 8/33; G06F 8/71; G06F 8/75; G06F 8/70; G06F 8/72; G06F 8/30;
(Continued)

(56) References Cited

U.S. PATENT DOCUMENTS

| 7,337,124 | B2 * | 2/2008 | Corral ............... G06Q 10/06 705/7.17 |
| 7,386,831 | B2 * | 6/2008 | Flanagan ............ G06F 8/75 709/204 |

(Continued)

FOREIGN PATENT DOCUMENTS

| CN | 101782849 A | 7/2010 |
| CN | 104123273 A | 10/2014 |

OTHER PUBLICATIONS

Ioannis Stamelos et al., Code quality analysis in open source software development, 2002, [Retrieved on Jul. 15, 2020]. Retrieved from the internet: <URL: https://s3.amazonaws.com/academia.edu.documents/3436909/stamelos2002.pdf?> 18 Pages (43-60) (Year: 2002).*

(Continued)

*Primary Examiner* — Anibal Rivera
(74) *Attorney, Agent, or Firm* — Ray Quinney & Nebeker P.C.; James Bullough

(57) ABSTRACT

A comment quality system for improving comments for source code includes a processor and memory. An operating system is executed by the processor and memory. A comment quality application, executed by the processor and memory, is configured to receive data relating to a number of source code comments that are associated with source code developed in a code developer application, generate a desired number of comments based on an estimated quality of comments for a code developer and a number of reviewers of the source code, and send feedback to the code
(Continued)

developer application based on the desired number of comments for the source code and the number of source code comments.

20 Claims, 8 Drawing Sheets

(51) Int. Cl.
| | |
|---|---|
| G06F 9/46 | (2006.01) |
| G06F 8/33 | (2018.01) |
| G06F 8/73 | (2018.01) |
| G06F 8/72 | (2018.01) |
| G06Q 10/06 | (2012.01) |
| G06Q 10/10 | (2012.01) |
| G06F 11/36 | (2006.01) |
| G06F 8/70 | (2018.01) |
| G06F 8/71 | (2018.01) |

(52) U.S. Cl.
CPC ..... *G06Q 10/06398* (2013.01); *G06Q 10/101* (2013.01); *G06F 8/70* (2013.01); *G06F 8/71* (2013.01); *G06F 11/3604* (2013.01); *G06F 11/3616* (2013.01)

(58) Field of Classification Search
CPC .... G06F 16/355; G06F 16/31; G06F 16/4393; G06F 11/362; G06F 11/3664; G06F 11/3604; G06F 11/3676; G06F 17/241; G06F 21/577; G06Q 10/06395; G06Q 10/06398; G06Q 10/101
See application file for complete search history.

(56) References Cited

U.S. PATENT DOCUMENTS

| | | | | |
|---|---|---|---|---|
| 7,757,163 | B2* | 7/2010 | Doganata | G06F 16/31 |
| | | | | 715/230 |
| 7,904,802 | B1* | 3/2011 | Kolawa | G06Q 10/103 |
| | | | | 715/230 |
| 8,374,975 | B1* | 2/2013 | Cierniak | G06F 40/169 |
| | | | | 706/12 |
| 9,235,493 | B2* | 1/2016 | Goetsch | G06F 11/3604 |
| 9,311,056 | B2* | 4/2016 | Armstrong | G06F 8/30 |
| 9,430,229 | B1* | 8/2016 | Van Zijst | G06F 9/3844 |
| 9,678,746 | B2* | 6/2017 | Abuelsaad | G06F 8/72 |
| 10,025,765 | B2* | 7/2018 | Hughes | G06F 8/70 |
| 10,068,093 | B2* | 9/2018 | Brucker | G06F 8/43 |
| 10,180,836 | B1* | 1/2019 | Arguelles | G06F 8/33 |
| 2006/0241909 | A1* | 10/2006 | Morgan | G06Q 10/06 |
| | | | | 702/183 |
| 2007/0168959 | A1* | 7/2007 | Bayari | G06Q 10/10 |
| | | | | 717/120 |
| 2009/0094580 | A1* | 4/2009 | Bank | G06F 8/73 |
| | | | | 717/123 |
| 2009/0249299 | A1* | 10/2009 | Farchi | G06F 11/3676 |
| | | | | 717/125 |
| 2010/0299361 | A1* | 11/2010 | Geney | G06Q 30/02 |
| | | | | 707/780 |
| 2011/0022551 | A1* | 1/2011 | Dixon | G06F 11/3616 |
| | | | | 706/12 |
| 2011/0055798 | A1* | 3/2011 | Kraft | G06F 11/3604 |
| | | | | 717/100 |
| 2012/0036492 | A1* | 2/2012 | Armstrong | G06F 8/71 |
| | | | | 717/100 |
| 2013/0042171 | A1* | 2/2013 | Yang | G06F 16/4393 |
| | | | | 715/230 |
| 2013/0074038 | A1* | 3/2013 | Fox | G06F 8/70 |
| | | | | 717/122 |
| 2014/0157239 | A1* | 6/2014 | Goetsch | G06F 11/3604 |
| | | | | 717/126 |
| 2014/0289697 | A1* | 9/2014 | Wenda | G06Q 10/06 |
| | | | | 717/102 |
| 2014/0351795 | A1* | 11/2014 | Alfieri | G06F 30/33 |
| | | | | 717/125 |
| 2015/0058282 | A1* | 2/2015 | Saraya | G06Q 10/0631 |
| | | | | 707/608 |
| 2015/0067460 | A1* | 3/2015 | Beaumont | G06F 40/169 |
| | | | | 715/205 |
| 2016/0034275 | A1* | 2/2016 | Abuelsaad | G06F 8/30 |
| | | | | 717/123 |
| 2016/0266896 | A1* | 9/2016 | Fan | G06F 8/33 |
| 2017/0075790 | A1* | 3/2017 | Macleod | G06F 11/3668 |
| 2017/0109179 | A1* | 4/2017 | Hughes | G06Q 30/018 |
| 2017/0169228 | A1* | 6/2017 | Brucker | G06F 21/577 |
| 2017/0357565 | A1* | 12/2017 | Ledet | G06F 8/73 |
| 2018/0253297 | A1* | 9/2018 | Richardson | G06F 16/24578 |

OTHER PUBLICATIONS

Daniela Steidl et al., Quality Analysis of Source Code Comments, 2013, [Retrieved on Jul. 15, 2020]. Retrieved from the internet: <URL: https://www.cqse.eu/fileadmin/content/news/publications/2013-quality-analysis-of-source-code-comments.pdf> 10 Pages (1-10) (Year: 2013).*

"International Search Report and Written Opinion Issued in PCT Application No. PCT/CN2016/098410", dated Jun. 9, 2017, 11 Pages.

* cited by examiner

SYSTEMS AND METHODS FOR DETERMINING AND ENFORCING THE OPTIMAL AMOUNT OF SOURCE CODE COMMENTS

RELATED APPLICATION

This application is a U.S. Nationalization of International Patent Application No. PCT/CN2016/098410 filed on Sep. 8, 2016. The aforementioned application is incorporated by reference in its entirety.

FIELD

The present disclosure elates to source code development tools, and more particularly to systems and methods for determining and enforcing the optimal amount of source code comments.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Comments are an important part of source code development. Comments are usually prepared by source code developers to help make the source code easier to understand. For example, the comments may be read by reviewers when reviewing the source code and by co-developers when assisting the developer and/or writing other source code that interacts with the source code. A sufficient number of comments are a prerequisite for high quality source code. However, enforcing the requirement for a sufficient number of comments is difficult because there are no quantitative standards concerning how many comments are adequate.

In some situations, the source code developer may only write a few comments to reduce development effort and cost. As a result, the source code is usually hard to understand, review and/or maintain. Alternately, the source code developers are forced to write more than enough comments at the expense of extra developmental effort and increased cost. Either result reduces the efficiency of source code development.

SUMMARY

A comment quality system for improving comments for source code includes a processor and memory. An operating system is executed by the processor and memory. A comment quality application, executed by the processor and memory, is configured to receive data relating to a number of source code comments that are associated with source code developed in a code developer application, generate a desired number of comments based on an estimated quality of comments for a code developer and a number of reviewers of the source code, and send feedback to the code developer application based on the desired number of comments for the source code and the number of source code comments.

In other features, the comment quality application is configured to generate a D-R relationship based on an estimated quality of comments for the code developer and the number of reviewers of the source code. The comment quality application is configured to maintain developer profiles of a plurality of code developers including the code developer. The developer profiles include the estimated quality of comments prepared by the code developer.

In other features, the comment quality application is configured to maintain reviewer profiles of a plurality of the reviewers. The reviewer profiles are based on relative skill levels of the plurality of the reviewers. The comment quality application is configured to generate the desired number of comments further based the developer profile.

In other features, the comment quality application is configured to monitor the number of comments associated with source code of the code developer. The comment quality application is configured to monitor effort levels of one or more of the reviewers when reviewing the source code. The comment quality application is configured to set the estimated quality of the code developer equal to a default value if a code developer profile corresponding to the code developer does not store a profile. The default value of the code developer equal to an average quality of a plurality of code developers.

A non-transitory, tangible computer-readable medium storing instructions for improving source code comments for source code the non-transitory, tangible computer-readable medium includes instructions for receiving data relating to a number of source code comments that are associated with source code developed in a code developer application; generating a desired number of comments based on an estimated quality of comments for a code developer and the number of reviewers of the source code; and sending feedback to the code developer application based on the desired number of comments for the source code and the number of source code comments.

In other features, the non-transitory, tangible computer-readable medium includes instructions for generating a D-R relationship based on an estimated quality of comments for the code developer and the number of reviewers of the source code.

In other features, the non-transitory, tangible computer-readable medium includes instructions for maintaining developer profiles of a plurality of code developers including the code developer. The developer profiles include the estimated quality of comments prepared by the code developer. The non-transitory, tangible computer-readable medium includes instructions for maintaining reviewer profiles of a plurality of the reviewers. The reviewer profiles define relative skill levels of the plurality of the reviewers. The non-transitory, tangible computer-readable medium includes instructions for generating the desired number of comments further based the developer profile.

In other features, the non-transitory, tangible computer-readable medium includes instructions for monitoring the number of comments associated with source code of the code developer.

In other features, the non-transitory, tangible computer-readable medium includes instructions for monitoring effort levels of one or more of the reviewers when reviewing the source code.

A code developer system includes a processor and memory. An operating system is executed by the processor and memory. A code developer application, executed by the processor and memory, is configured to provide a source de development environment for generating source code and source code comments corresponding to the source code, generate and send source code comment data corresponding to a length of the source code and a number of source code comments for the source code to a source code comment reviewing application, and receive a desired number of source code comments for the source code from the source code comment reviewing application, and compare the desired number of source code comments to the number of source code comments.

In other features, the code developer application generates a user notification when the number of source code comments is less the desired number of source code comments. The code developer application generates and sends the comment data at least one of periodically and on an event basis to the source code comment reviewing application.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Systems and methods according to the present disclosure define and determine a quantitative value corresponding to an optimum amount of comments (OAC) for source code during source code development. Determining the OAC value involves conflicting interests. On the one hand, source code developers want to deliver the source code with minimum effort. Therefore, the source code developers want the OAC value to be low. On the other hand, the source code reviewers want to understand the source code with minimum effort, so they hope that the OAC value will be high. From the stand point of a team or a corporation, the OAC value may be optimized in the sense that the total effort of developing the source code, preparing the comments, and reviewing the source code is minimized.

Figure 1A:
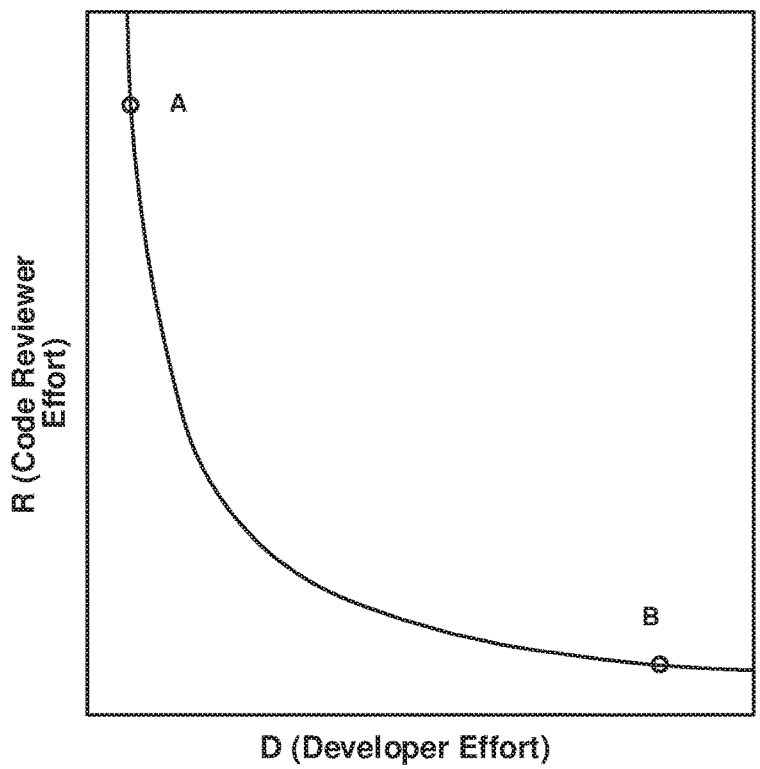
FIGS. 1A-1C are graphs illustrating examples of relationships between relative efforts made by the source code developer and the source code reviewer according to the present disclosure.
Figure 1B:
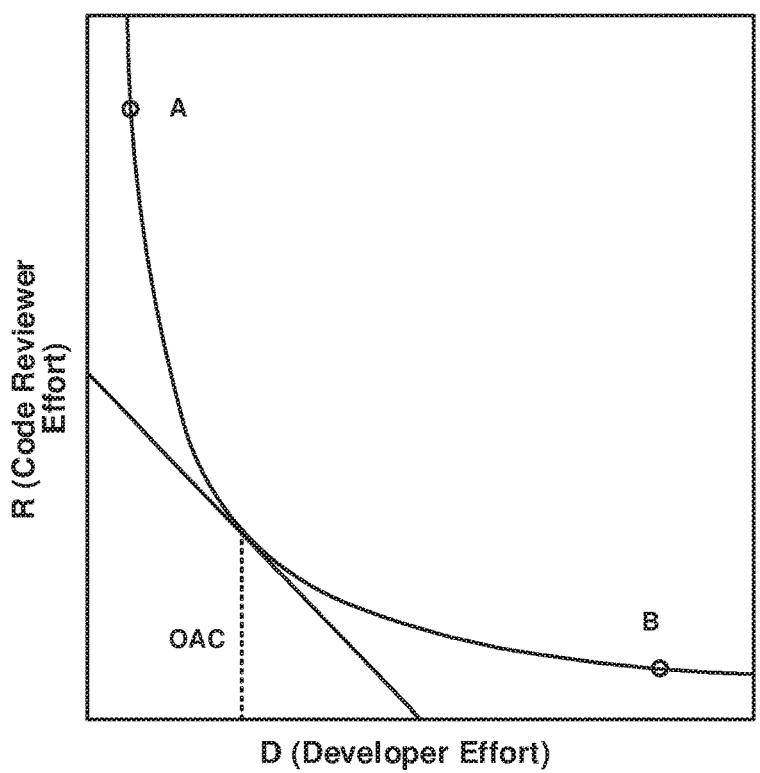
Figure 1C:
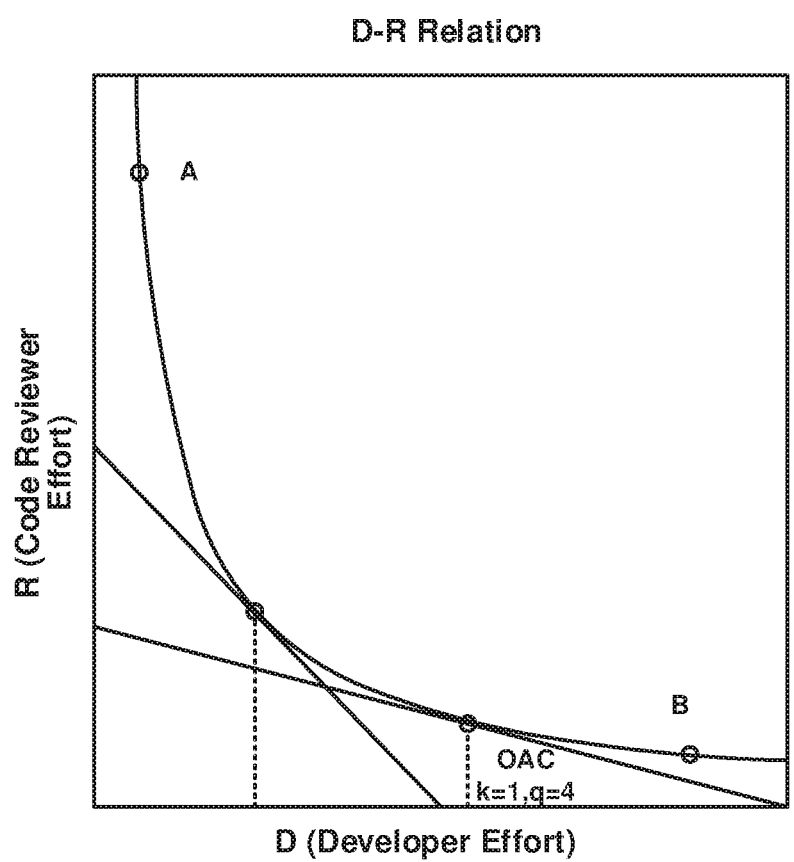

Referring now to FIGS. 1A-1C, to formulate the problem, D denotes the effort made by the source code developers to write the source code comments. R denotes the effort made by source code reviewers to understand the source code. In some examples, time is used to measure the effort made by the source code developer and the source code reviewer. Usually R and D are conversely related. In other words, the more effort D that is spent by the source code developers (writing additional source code comments), the less effort R will be spent by the source code reviewers (since it is easier to understand the source code), and vice versa. The relationship between D and R is named the D-R relation. In some examples, the OAC value is determined in part based on the length of the source code comments.

When there are relatively few source code comments, additional source code comments will be of great help to the source code reviewers (see point A in FIG. 1A). When there are a sufficient number of source code comments, adding additional source code comments is almost useless for the source code reviewers (see point B in FIG. 1A).

Generally, the source code is developed once and read by one or more reviewers. A model for this system is:

$$\min(D+kR)$$

where k is a parameter representing the number of times the source code will be read. Another factor that will affect the objective is the comment quality. Comments with high quality make it easier to understand the source code and tend to reduce the effort required by the source code reviewers. A modified model for this system is:

$$\min(D+kqR)$$

where q denotes the comment quality. High comment quality corresponds to a small value of q, and a small value of the term for the reviewer (kqR). Given the above discussion, the objective function is a linear function. Therefore, the optimal amount of comments (OAC) can be uniquely determined (see FIG. 1B).

Different source code developers may have different comment qualities. In other words, n developers in the system have corresponding quality parameters $q_1, q_2, \ldots, q_n$. In addition, a general q represents average comment quality of the developer. If comments from a source code developer have increasingly high quality, the value of $q_i$ will become smaller and the OAC will be smaller. In other words, if comments from the source code developer have high quality, fewer comments will be required (see FIG. 1C), and vice versa.

Figure 2:
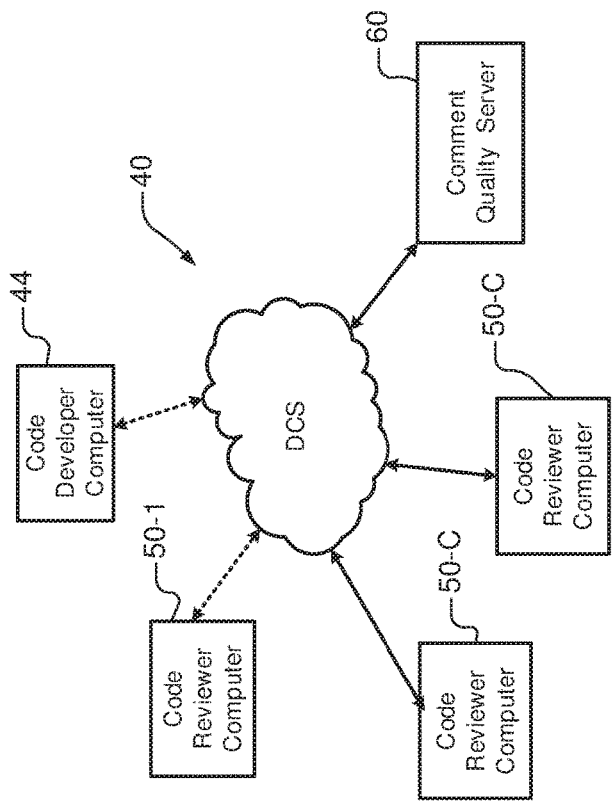
FIG. 2 is a functional block diagram illustrating an example of a system including source code developer computers, source code reviewer computers and a comment quality server according to the present disclosure.

Referring now to FIG. 2, an example of a system for evaluating source code comment quality and providing feedback to the source code developers is shown. One or more code developer computers 44 are connected to a distributed communications system 40 such as a local area network (LAN), a wide area network (WAN) such as the Internet, etc. Code developers write source code and prepare comments for the source code using the one or more code developer computers 44.

One or more code reviewer computers 50-1, 50-2, . . . 50-C (code reviewer computers 50) are also connected to the distributed communications system 40. Code reviewers (such as source de reviewers or other source code developers) revising the source code use the code reviewer computers 50. A comment quality server 60 monitors and exchanges data with the code developer computers 44 and the code reviewer computers 50. The comment quality server 60 evaluates the number and quality of comments associated with the source code previously prepared by the source code developer and provides feedback to the source code developer for the current source code based upon the estimated quality of prior comments made by the source code developer and the estimated number of times the current source code will be read. While physical computers are shown, virtual machines in the cloud and/or combinations of physical and virtual machines can be used.

Figure 3:
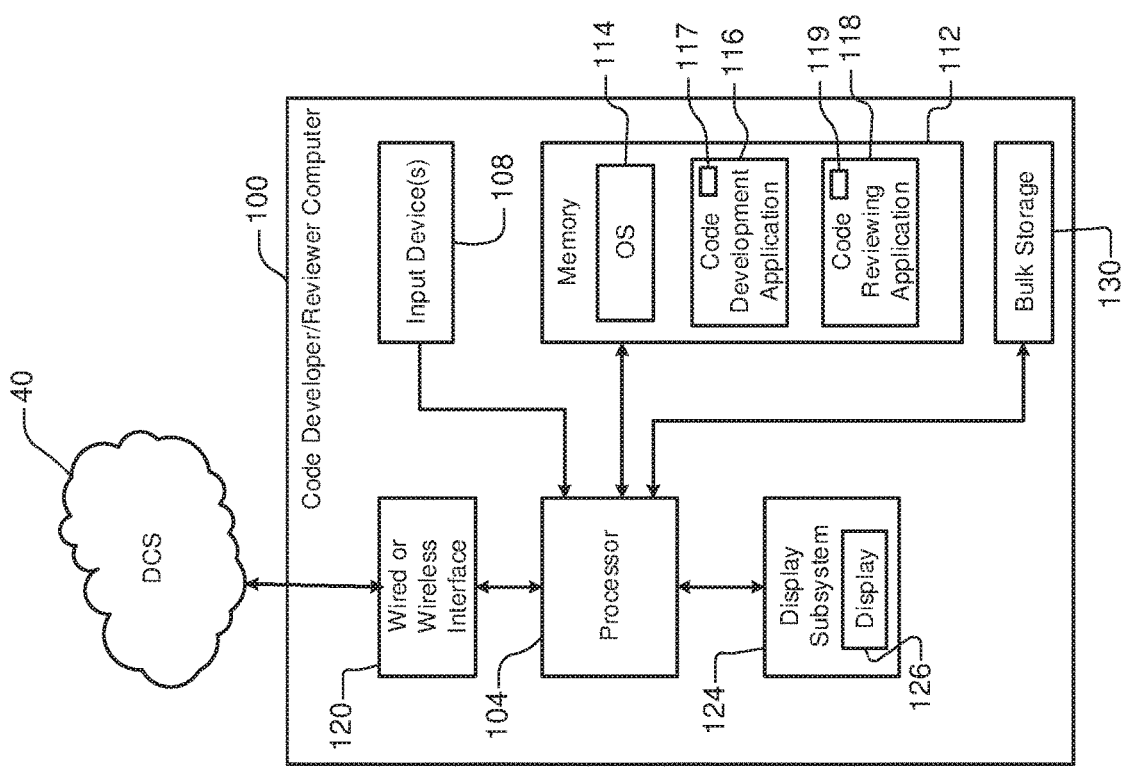
FIG. 3 is a functional block diagram of an example of a source code developer computer according to the present disclosure.

Referring now to FIG. 3, an example of a computer 100 that can be used for source code development and/or for source code review is shown. The computer 100 includes a processor 104 and one or more input devices 108 such as a keyboard mouse, touchscreen, etc. The computer 100 further includes memory 112 such as volatile or nonvolatile memory that stores an operating system 114, a source code development application 116 and/or a source code reviewing application 118. While the source code development application 116 and the source code reviewing application 118 are both shown on the same computer, source code reviewers need not have the code development application 116 and the add-in application 117 installed. Likewise source code developers need not have the source code reviewing application 118 and the add-in application 119 installed.

The source code development application 116 provides a coding environment for developing source code and comments related to the source code. In some examples, the source code development application 116 includes Visual Studio®, although other code development programs may be used. In some examples, the source code development application 116 includes an add-in application 117 to remotely communicate information (e.g. relating to the length of the source code and the number of comments in the source code) with the comment quality server 60. In other words, the add-in application 117 can periodically send the length of the source code and/or the number of comments in the source code to the comment quality server 60 during development. Alternately, the add-in application 117 can send the information in response to a query from the comment quality server 60. In still other examples, the add-in application 117 can send the information in response to an event such as opening, changing and/or closing an application development file. The add-in application 117 also receives feedback from the comment quality server 60 and generates suitable notifications for the code developer.

The source code reviewing application 118 provides a code reviewing environment for reviewing source code. In some examples, the source code reviewing application 118 includes CodeFlow®, although other code reviewing applications can be used. In some examples, the source code reviewing application 118 includes an add-in application 119 that is used to monitor the effort of the source code reviewer and to communicate information to the comment quality server 60.

For example, the add-in application 119 may monitor the identity of the reviewer and the amount of time that the source code reviewing application 118 has the source code file open. In some examples, the time is accumulated only when the source code reviewing application 118 is maximized. In some examples, additional measures may be taken to ensure that the source code reviewer is actually working on the source code. For example, the source code reviewing application may accumulate time during adjacent time windows only if one or more of the following are detected (cursor movement, mouse or keyboard input, voice recognition input, etc.) during the time window.

As will be described further below, the source code development application 116 provides data to the comment quality server 60 and receives feedback regarding the number and quality of the comments associated with the current source code.

The computer 100 further includes an interface 120 to the distributed communications system 40. For example, the interface 120 may include a wired interface such as an Ethernet interface and/or a wireless interface. The computer 100 includes a display subsystem 124 including a display 126. The computer 100 further includes bulk storage 130 such as a hard disk drive or bulk flash memory. The computer 100 may be located on premises or may be a virtual machine in the cloud.

Figure 4:
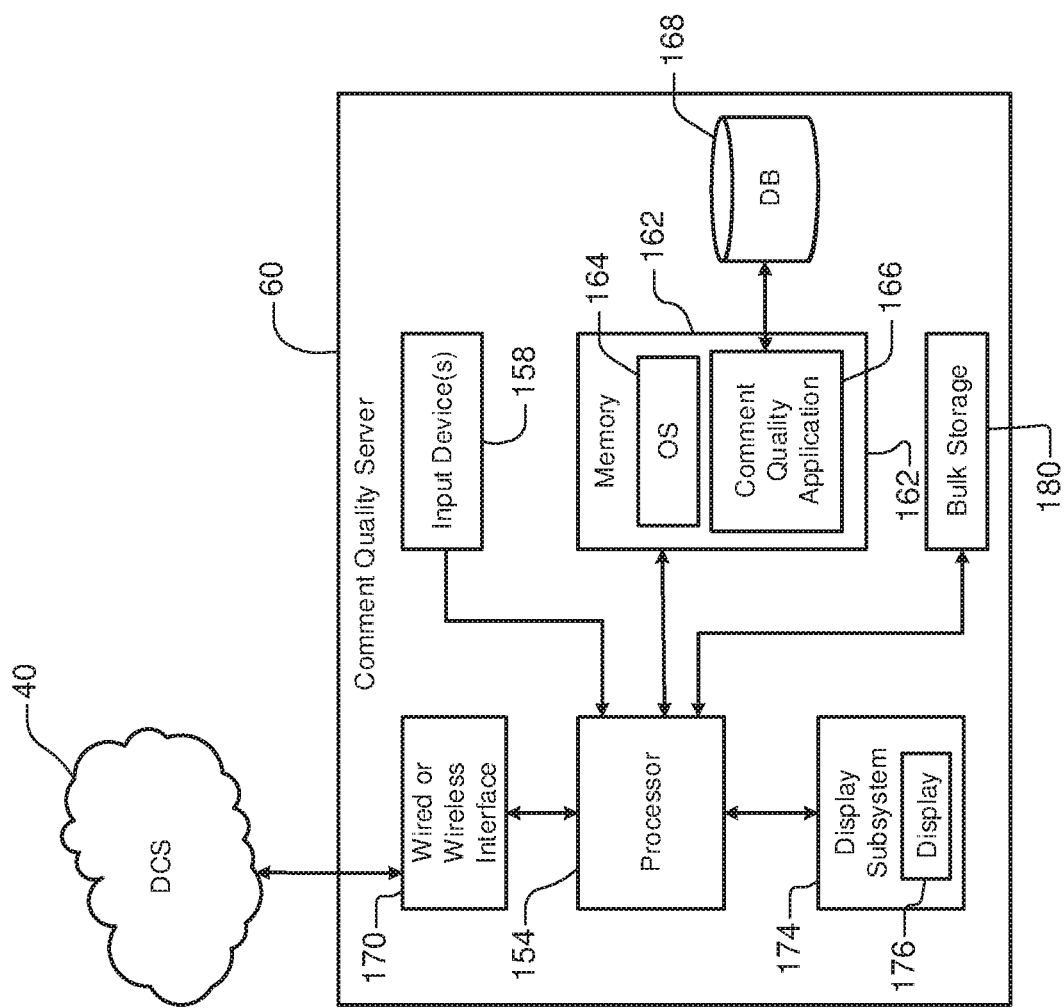
FIG. 4 is a functional block diagram of an example of a comment quality server according to the present disclosure.

Referring now to FIG. 4, an example of the comment quality server 60 is shown. The comment quality server 60 includes a processor 154 and one or more input devices 158 such as a keyboard, mouse, touchscreen, etc. The comment quality server 60 further includes memory 162 such as volatile or nonvolatile memory that stores an operating system 164 and a comment quality application 166. A database 168, which can be local or remote, stores developer profiles and/or reviewer profiles. The comment quality server 60 further includes an interface 170. The interface 170 may be a wired interface such as an Ethernet interface and/or a wireless interface.

The comment quality server 60 further includes a display subsystem 174 including a display 176. The comment quality server 60 further includes bulk storage 180 such as a hard disk drive or bulk flash memory.

Figure 5:
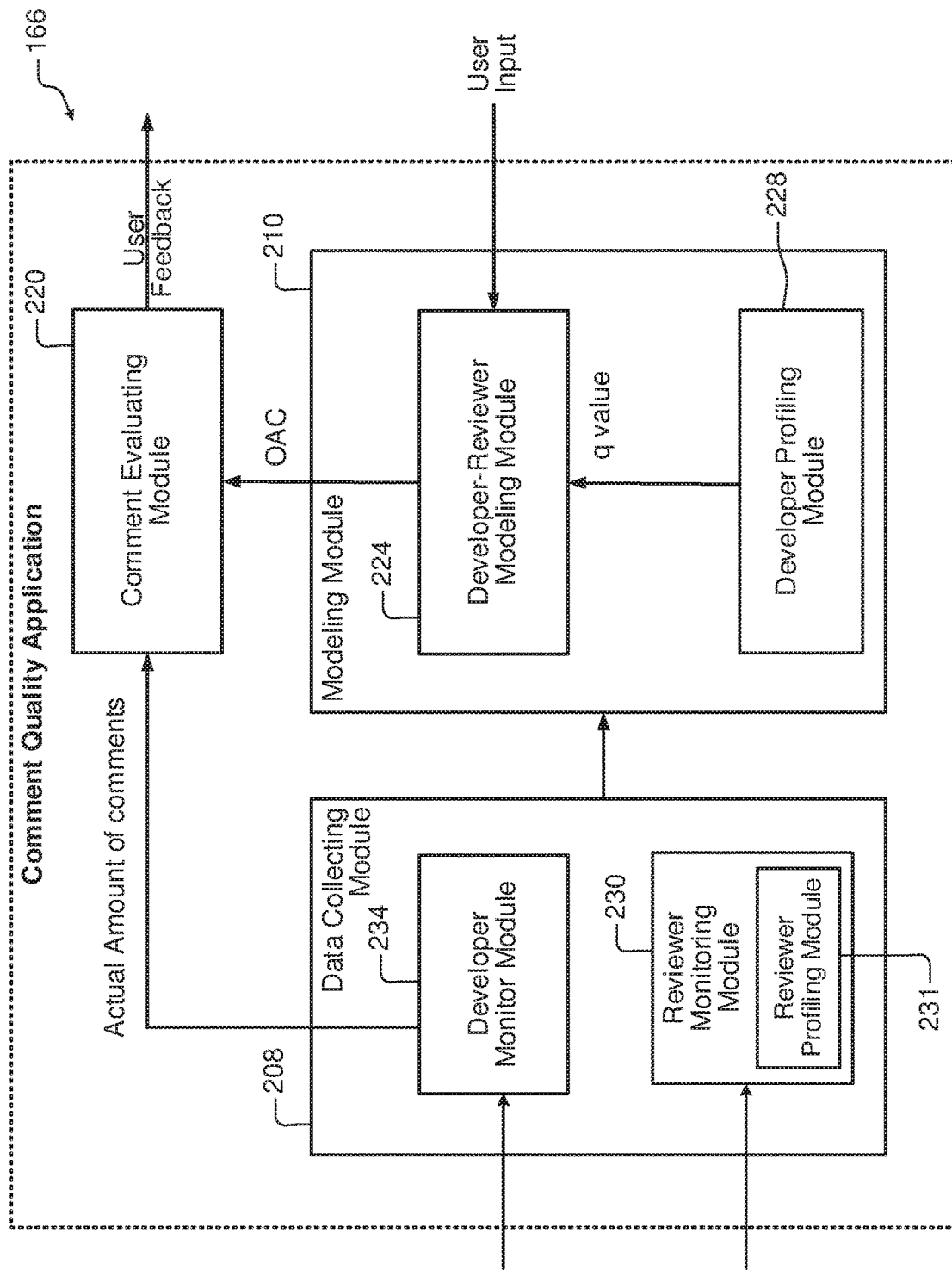
FIG. 5 is a functional block diagram of a comment quality application according to the present disclosure.

Referring now to FIG. 5, the comment quality application 166 includes a data collecting module 208, a modeling module 210, and a comment evaluating module 220. The modeling module 210 includes a D-R modeling module 224 and a developer profiling module 228. The data collecting module 208 includes a developer monitoring module 234 and a reviewer monitoring module 230.

The developer profiling module 228 is used when the quality of the code developer comments is taken into account. The developer profiling module 228 maintains profiles of the source code developers along with details relating to comment quality $q_i$ of the corresponding developer. For example, the developer profiling module 228 associates each of the developers with a developer identification (ID) number and the $q_i$ value of the corresponding developer. The $q_i$ value for the source code developer may be based on the developer's experience level and other factors.

The developer monitoring module 234 monitors efforts of the source code developers in writing source code and comments. The developer monitoring module 234 also records the current number of comments in the source code and/or the overall length of the source code.

The reviewer monitoring module 230 monitors efforts of the reviewers when reviewing the source code. In some examples, the reviewer monitoring module 230 monitors the amount of time spent by each reviewer. In some examples, the reviewer profiling module 231 maintains profiles of the source code reviewers along with details relating to the relative skill level of the reviewer and/or their efficiency at reviewing source code. For example, the reviewer profiling module 231 associates each of the developers with a developer identification (ID) number and a skill level of the corresponding reviewer. In some examples, the skill level may be based on the number of years of experience of the code reviewer. The relative skill level of the reviewer may be taken into account when evaluating the amount of effort expended by the reviewer. For example a less experienced source code reviewer may take longer to review the source code than a more experienced source code reviewer. Alternately, effort made by source code reviewers may be weighted based on their individual efficiency as determined by a comparison with other source code reviewers having similar experience, reviewing the same source code or different source code having a similar length and/or difficulty.

The D-R modeling module 224 establishes the D-R relationship and determines a value for a desired number of comments or an optimum amount of comments (OAC). The D-R modeling module 224 generates the OAC value based upon the q value of the developer and the k value based on the number of times the code will be read and/or reviewed. The comment evaluating module 220 compares the OAC value with a current number of comments in the current source code and provides feedback to the code developer.

Figure 6:
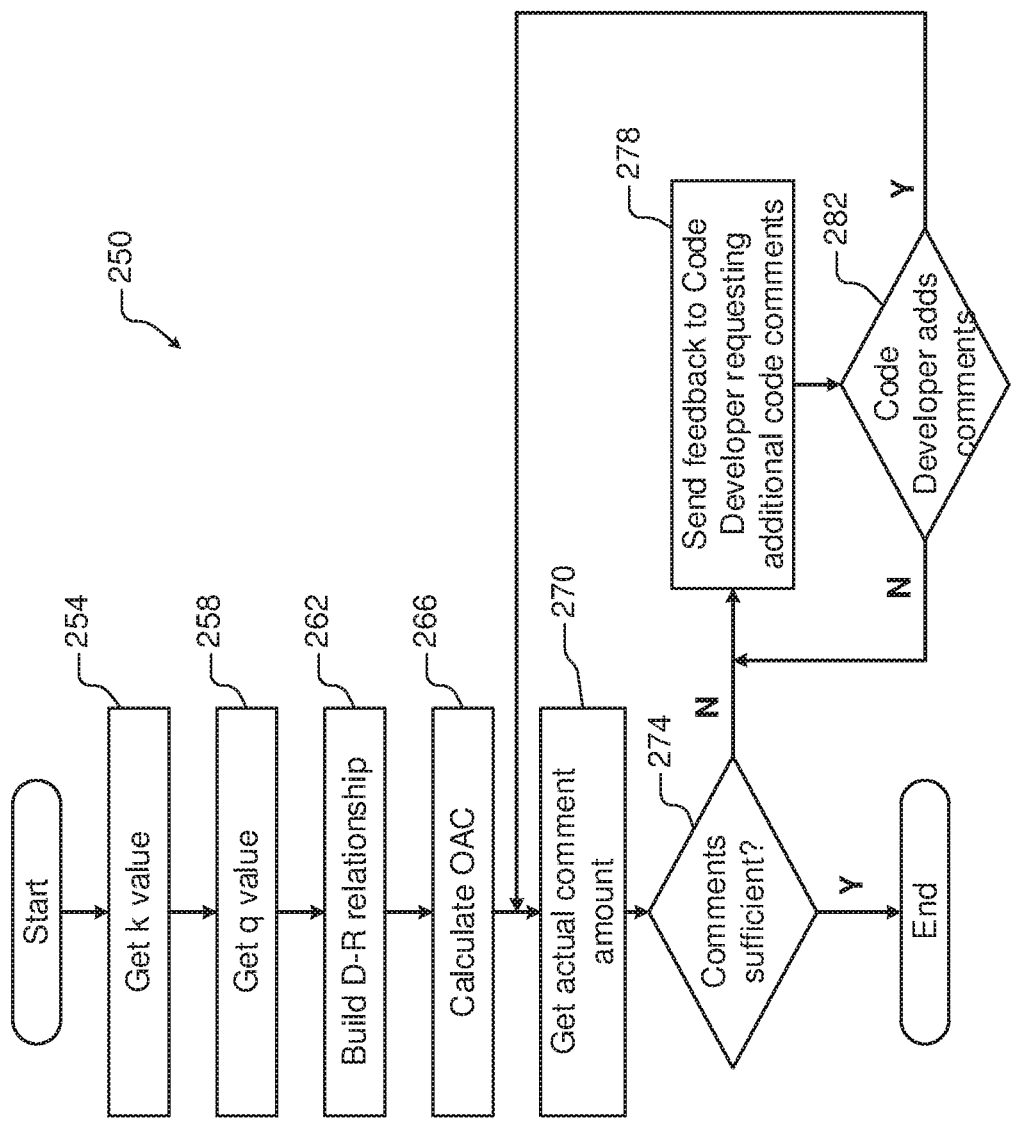
FIG. 6 illustrates a method for generating a value corresponding to an optimum amount of comments (OAC) and providing feedback to the source code developer computer according to the present disclosure.

Referring now to FIG. 6, a method 250 performed by the comment quality server 60 is shown. At 254, the comment quality server 60 obtains the k value from user input. In some examples, the k value is set equal to the number of code reviewers plus a constant.

At 258, the developer profiling module 220 estimates the q value for the current code developer. At 262, based on the input from 254 and 258, the D-R modeling module 224 establishes the D-R relationship. At 266, using the D-R relationship, the D-R modeling module 224 calculates the OAC value. At 270, the comment evaluating module 220 obtains the current number of source code comments from the developer monitoring module 234.

At 274, the comment evaluating module 220 compares the current number of comments with the OAC value. If the number of source code comments is sufficient as determined at 274, the method ends. If the number f source code comments is insufficient as determined at 274, the comment evaluating module 220 provides feedback and informs the source code developer that additional source code comments are required.

At 282, if the current code developer adds additional comments to the source code, the method continues at 270. In some examples, the current code developer may provide justification for an insufficient number of comments.

Figure 7:
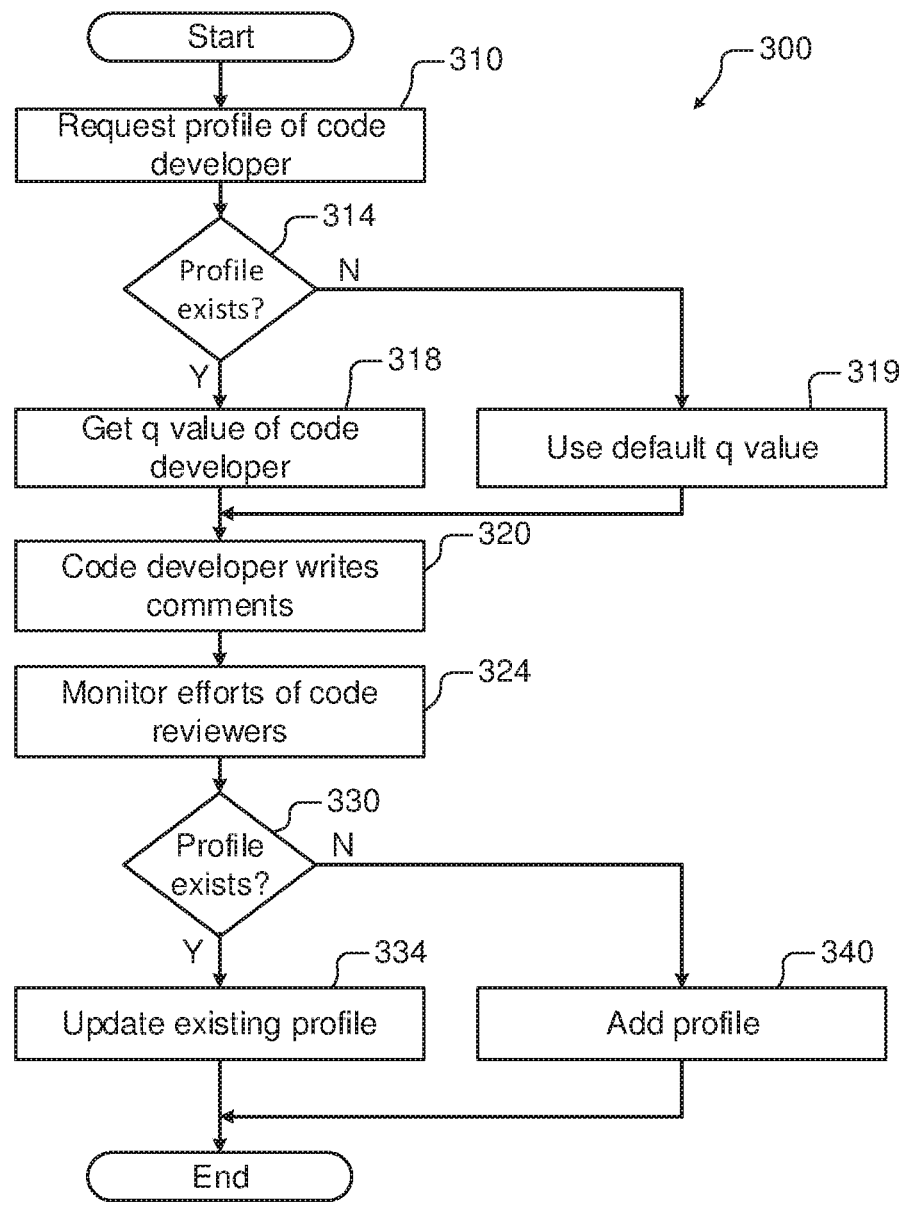
FIG. 7 illustrates a method for accessing and updating profiles of code developers according to the present disclosure.

Referring now to FIG. 7, a method 300 for maintaining a source code developer's profile (to track comment quality q) is shown. FIG. 6 demonstrated a method performed when the source code developer begins to write source code and comments to a point when the source code reviewers have finished reviewing the source code. At 310, the D-R modeling module 224 requests the current developer's profile from the developer profiling module 220. If the profile exists as determined at 314, then the developer profiling module 220 returns the $q_i$ value of the current source code developer. If the profile for the current source code developer does not exist as determined at 314, the developer profiling module uses a default q value at 319. In some examples, the default q value is set equal to the average code developer, although other default values may be used.

After 318 or 319, the q value is determined. The D-R relationship and the OAC value can be obtained. Meanwhile, the developer writes source code and comments at 320. When source code development is finished, the source code and comments are reviewed. The reviewer monitoring module 230 records efforts of the code reviewers when reviewing the source code. For example, the reviewer monitoring module 230 records the amount of time that the reviewer reviews the source code and comments. The purpose of the monitoring of the reviewers is to evaluate the comment quality of the code developers and/or the efficiency of the reviewers.

After receiving additional feedback from the reviewer monitoring module 230, the developer profiling module 228 decides whether or not to add a new profile for the current code developer at 330. In some examples, the developer profiling module 228 adds a new profile when the current source code developer has newly entered the system (and does not have a profile) and the number of source code developing-review iterations for the current source code developer has exceeded a minimum threshold (so there is enough data to set up a profile). If 330 is true, the existing profile of the source code developer is updated at 334. In some examples, the profile for the average source code developer is also updated at this time. If 330 is false a new profile is added at 340. The new profile for the current source code developer is added based on the current developer-review iterations for the source code developer.

Figure 8:
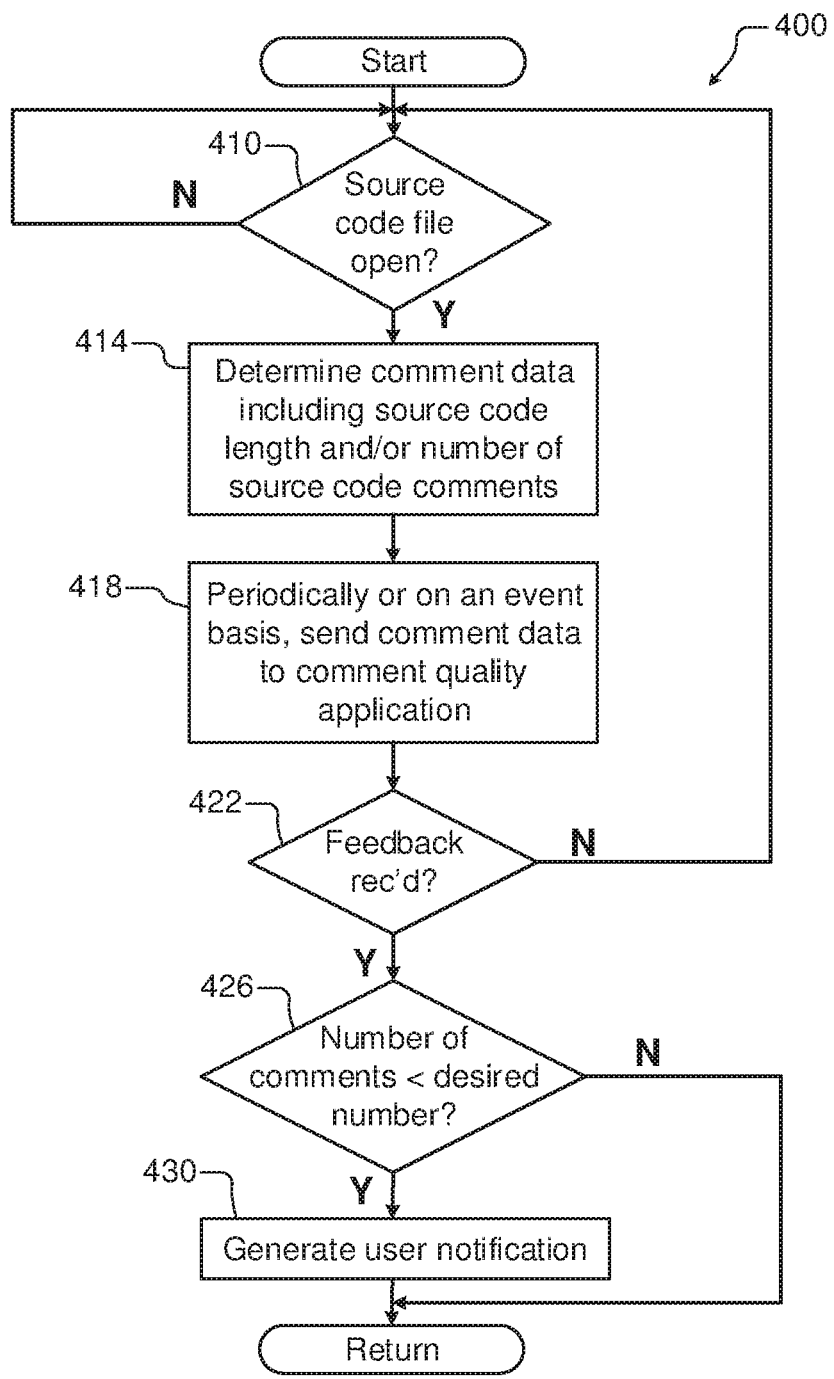
FIG. 8 illustrates a method performed by the code developer application to send data to the comment quality application and feedback received from the comment quality application.

Referring now to FIG. 8, a method 400 performed by the code developer application 116 and the add-in application 117 is shown. At 410, the method determines whether or not one of the source code files is open. At 414, the number of source code comments and/or the source code length is determined. At 418, periodically or on an event basis, the data is sent to the comment quality application. For example, suitable events may include user action to send the data, opening the source code file, closing the source code file, on changes to the source code file, when a predetermined number of lines of source code have been added since a prior update, etc.

At 422, the method determines whether or not feedback has been received from the comment quality application. If 422 is false, control returns to 410. If 422 is true, the method determines whether or not the number of source code comments is less than the desired number of source code comments. If 426 is true, the method generates a user notification and control returns. For example, the code developer application 116 and the add-in application 117 may generate a dialog box, notification, sound or other on-screen message or indication. If 426 is false, control returns.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example a server (also known as remote, or cloud) module may accomplish some functionality on behalf of a client module.

The term application or code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A comment quality system for improving comments for source code, comprising:
  a processor and memory;
  an operating system executed by the processor and memory; and
  a comment quality application, executed by the processor and memory, that is configured to:
    receive data relating to a number of source code comments that are associated with source code developed by a remote code developer in a remote code developer application;

determine a desired number of source code comments based on an estimated quality of comments for the remote code developer and an estimated number of times that of the source code will be read by one or more reviewers; and send feedback to the remote code developer application based on a comparison between the desired number of source code comments and the number of source code comments.

2. The comment quality system of claim 1, wherein the comment quality application is configured to generate a D-R relationship based on an estimated quality of comments for the code developer and the estimated number of times that the source code will be read by one or more reviewers.

3. The comment quality system of claim 2, wherein the comment quality application is configured to maintain developer profiles of a plurality of code developers including the code developer.

4. The comment quality system of claim 3, wherein the developer profiles include the estimated quality of comments prepared by the code developer.

5. The comment quality system of claim 2, wherein the comment quality application is configured to maintain reviewer profiles of a plurality of the reviewers, wherein the reviewer profiles are based on relative skill levels of the plurality of the reviewers.

6. The comment quality system of claim 5, wherein the comment quality application is configured to determine the desired number of comments further based the developer profile.

7. The comment quality system of claim 1, wherein the comment quality application is configured to monitor the number of comments associated with source code of the code developer.

8. The comment quality system of claim 7, wherein the comment quality application is configured to monitor effort levels of one or more of the reviewers when reviewing the source code.

9. The comment quality system of claim 3, wherein the comment quality application is configured to set the estimated quality of the code developer equal to a default value if a code developer profile corresponding to the code developer does not store a profile.

10. The comment quality system of claim 9, wherein the default value of the code developer is set equal to an average quality of a plurality of code developers.

11. A non-transitory, tangible computer-readable medium storing instructions for improving source code comments for source code, the non-transitory, tangible computer-readable medium comprising instructions for:

receiving data relating to a number of source code comments that are associated with source code developed by a remote code developer in a remote code developer application;

determining a desired number of source code comments based on an estimated quality of comments for the remote code developer and an estimated number of times that of the source code will be read by one or more reviewers; and sending feedback to the remote code developer application based on a comparison between the desired number of source code comments and the number of source code comments.

12. The non-transitory, tangible computer-readable medium of claim 11, further comprising instructions for:

generating a D-R relationship based on an estimated quality of comments for the code developer and the estimated number of times that the source code will be read by one or more reviewers.

13. The non-transitory, tangible computer-readable medium of claim 11, further comprising instructions for:

maintaining developer profiles of a plurality of code developers including the code developer, wherein the developer profiles include the estimated quality of comments prepared by the code developer.

14. The non-transitory, tangible computer-readable medium of claim 12, further comprising instructions for maintaining reviewer profiles of a plurality of the reviewers, wherein the reviewer profiles define relative skill levels of the plurality of the reviewers.

15. The non-transitory, tangible computer-readable medium of claim 14, further comprising instructions for determining the desired number of comments further based the developer profile.

16. The non-transitory, tangible computer-readable medium of claim 11, further comprising instructions for monitoring the number of comments associated with source code of the code developer.

17. The non-transitory, tangible computer-readable medium of claim 16, further comprising instructions for monitoring effort levels of one or more of the reviewers when reviewing the source code.

18. A code developer system, comprising:
a processor and memory;
an operating system executed by the processor and memory; and
a code developer application, executed by the processor and memory, that is configured to:
provide a source code development environment for generating source code and source code comments corresponding to the source code;
generate and send source code comment data corresponding to a length of the source code and a number of source code comments for the source code to a source code comment reviewing application;
receive a desired number of source code comments for the source code from the source code comment reviewing application, the desired number of source code comments being based on an estimated quality of the source code comments and an estimated number of times that the source code will be read by one or more reviewers; and
compare the desired number of source code comments to the number of source code comments.

19. The code developer system of claim 18, wherein the code developer application generates a user notification when the number of source code comments is less the desired number of source code comments.

20. The code developer system of claim 18, wherein the code developer application generates and sends the comment data at least one of periodically and on an event basis to the source code comment reviewing application.

* * * * *